April 17, 1934.  A. KOWALSKI  1,955,134
REMOVABLE JAW ORANGE CLIPPER
Filed May 27, 1933
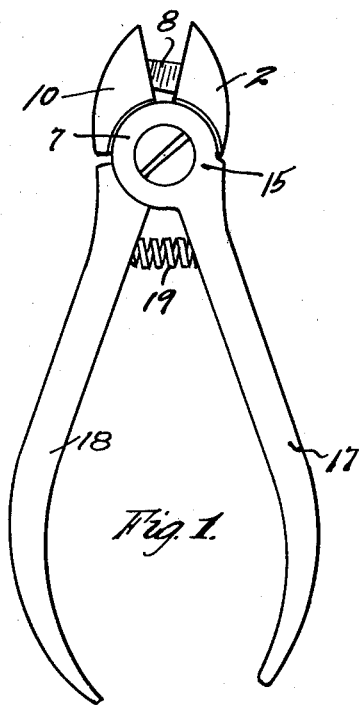
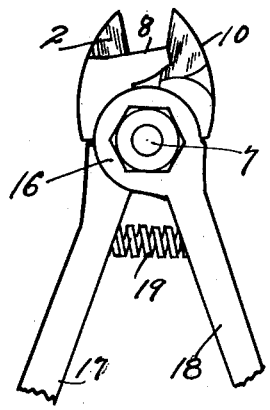
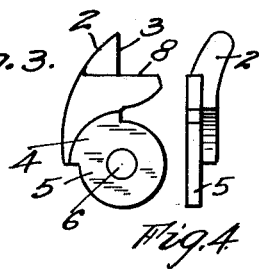
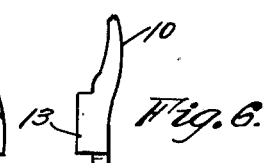
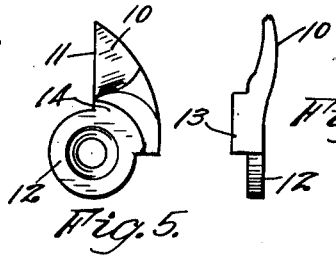
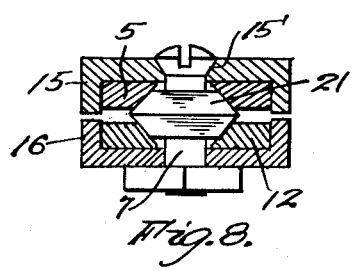
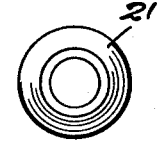
INVENTOR,
A. Kowalski
BY
Frederick E. Maynard,
ATTORNEY.

Patented Apr. 17, 1934

1,955,134

UNITED STATES PATENT OFFICE 1,955,134

REMOVABLE JAW ORANGE CLIPPER

Alexander Kowalski, Los Angeles, Calif.

Application May 27, 1933, Serial No. 673,228

1 Claim. (Cl. 30—24)

This invention relates to tools of a type to be used for cutting the stems of fruit, particularly oranges during the picking thereof.

It is an object of the present invention to provide, in a tool of this class, for the ready interchange of new cutting members for old cutting members which have become dulled from use and thereby to reduce replacement cost by enabling use of the original set of handles and the discard of only the dulled original cutters.

Heretofore orange cutters of a popular and practical type have been thrown away after the cutting edges have been resharpened a few times because they become ineffective from wear and resharpening. Thus the entire tool must be discarded. By the present invention it is only necessary to throw away small blade portions which, by the present invention, are removable at will from the handle members to provide for the application of a new set of blade parts.

The invention consists in certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Fig. 1 is a plan of the obverse face of the open tool.

Fig. 2 is a plan of the reverse face of the tool.

Fig. 3 is a plan of the reverse face of a stop, cutter element and,

Fig. 4 is an edge view thereof.

Fig. 5 is a reverse face view of the complementary cutter element and,

Fig. 6 is an edge view thereof.

Fig. 7 is a plan of a fragment of one of the handle levers showing its box hub.

Fig. 8 is an axial section through the assembled parts of the tool.

Fig. 9 is a plan of the cutter bearing washer.

In Figures 3 and 4 there is disclosed a cutter element having a radial body part 2, with a radial cutting edges 3, which is joined by a segmental neck 4 to a coplanar disc or hub 5 which has a central pivot hole 6 for a pivot bolt 7, Fig. 8. The blade body 2 is offset as shown in Fig. 4 from the plane of the disc 5 and is provided with a transverse spur 8 projecting beyond the cutting edge 3 so that as the tool is thrust against an orange stem the spur 8 engages the stem and forms a stop limiting the position of the tool for cutting operation.

In Figures 5 and 6 is shown a co-acting cutting element having a blade body 10 with a radial cutting edge 11, extending from the hub disc 12 as to the outer plane of which the cutting portion of the blade 10 is out-set as clearly shown in Fig. 6; the cutting blade 10 having a stop shoulder 13 offset from the inner face of the disc 12. The blade body 10 is joined to the disc 12 by a segmental neck 14.

The neck 14 and the neck 4 are about ninety degrees in angular length so as to interlock in cup-like hubs 15 and 16 of respective handles 17 and 18. In Fig. 7 the flange of the cup 15 is shown as interrupted for about ninety degrees of its length to receive and interlock with the applied hub neck 14 of the applied cutter 10; the hub 16 being similarly interrupted to receive and interlock with the neck 4 of the applied cutter 2. The handles 17—18 with their similarly interrupted cup flanges are duplicate except that the cup 15 is preferably provided with a counterbore 15' to receive a complementary, countersunk head of the pivot bolt 7.

Thus it will be seen that when applied the blade 10 and the handle 17 form a rigid, interlocked unit as also do the cutter 2 and its handle 18 and the handles are normally sprung to open position by suitable means, as an interposed spring 19.

While the inner faces of the discs 5—12 may be made to bear against each other during oscillation on the pivot bolt 7 it is preferred that the discs be spaced and rotated on an interposed twined, frusto, conoidal washer 21 disposed on the pivot bolt; the inner faces of the hub discs 5—12 being counterbored for such purpose.

From the above it will be seen that it is only necessary to remove the unduly worn cutter elements 2—10 as necessary and replace them by new cutters at a cost far below the comparative cost of a whole new tool.

What is claimed is:

A fruit stem cutting tool, comprising a pair of hand levers each with flat disc hub part having a narrow circular wall flange interrupted at one side and cooperating to form a box, a pair of demountable cutter parts comprising wide hubs discs rigidly fitting in the handle hubs and having opposed conical bores and coaxial pivot holes, a twined frusto-conoidal washer seated in the cutter discs and spacing them and the box flanges; and a pivot bolt passing through the box and its washer and being smaller than the pivot holes in the box so that the parts are centered by and have turning bearing on the bevel faces of the washer.

ALEXANDER KOWALSKI.